United States Patent
Dalton et al.

[15] 3,668,505
[45] June 6, 1972

[54] HIGH VOLTAGE REGULATION CIRCUIT

[72] Inventors: Oliver Dalton, Portland; Vaughn Weidel, Aloha, both of Oreg.

[73] Assignee: Tektronix, Inc., Beaverton, Oreg.

[22] Filed: July 20, 1970

[21] Appl. No.: 64,014

Related U.S. Application Data

[63] Continuation-in-part of Ser. No. 670,691, Sept. 26, 1967, abandoned.

[52] U.S. Cl. .................................321/2, 315/27, 321/19, 331/112
[51] Int. Cl. ...................H02m 3/32, H01j 29/70, H03k 3/30
[58] Field of Search ...............321/22, 18, 19; 331/109, 183, 331/112; 315/1, 3, 27; 174/DIG. 11

[56] References Cited

UNITED STATES PATENTS

| | | | |
|---|---|---|---|
| 3,113,275 | 12/1963 | Minter | 331/112 X |
| 3,132,309 | 5/1964 | Constable | 331/112 X |
| 3,202,902 | 8/1965 | Glass | 321/2 |
| 3,461,374 | 8/1969 | Rhyne | 321/19 X |
| 3,421,069 | 1/1969 | Minks | 321/2 |
| 2,697,798 | 12/1954 | Schlesinger | 321/2 |
| 3,192,464 | 6/1965 | Johnson et al. | 321/2 |

OTHER PUBLICATIONS

Wireless World, "Transistor Power Supplies," L. H. Light, pp. 582-586, Dec. 1955.

*Primary Examiner*—William H. Beha, Jr.
*Attorney*—Buckhorn, Blore, Klarquist and Sparkman

[57] ABSTRACT

A high voltage power supply for a cathode-ray tube includes an oscillator intercoupled with a transformer having a high voltage output winding. An additional low voltage winding on the transformer provides a signal substantially proportional to the high voltage output, and such signal is coupled by way of a peak detector to a control amplifier adapted to vary the d.c. bias value in the oscillator circuit. If the high voltage output tends to drop, the peak detector registers the lower voltage, causing the control amplifier to increase the amplitude of oscillations produced by the oscillator to thereby return the high voltage output toward a predetermined value. Since the low voltage winding does not provide a voltage value which is exactly proportional to the high voltage output, additional circuit means is included in series with the high voltage winding for coupling a current feedback to the control amplifier such that an increase in current drawn from the high voltage winding will also cause an increase in the amplitude of oscillations. By this means the actual high voltage output is closely regulated even though the regulation voltage is acquired at a low voltage level in the circuit.

14 Claims, 2 Drawing Figures

PATENTED JUN 6 1972

3,668,505

INVENTORS,
OLIVER DALTON
VAUGHN WEIDEL

BY
BUCKHORN, BLORE, KLARQUIST & SPARKMAN
ATTORNEYS

HIGH VOLTAGE REGULATION CIRCUIT

This is a continuation of application, Ser. No. 670,691, filed Sept. 26, 1967, now abandoned.

BACKGROUND OF THE INVENTION

A high voltage power supply for a cathode-ray tube in an oscilloscope must have good regulation since the calibration of the instrument is significantly affected by variation in supply voltage. The calibration of the instrument changes by approximately the same percentage as a change in the cathode supply voltage, thereby tending to cause erroneous readings. Therefore, regulation circuits are employed for holding the cathode voltage as closely as possible to a predetermined value. The usual circuit includes a voltage divider, one end being connected to the high voltage cathode, and the other end providing a proportional control voltage coupled to a regulation circuit near ground level. The regulation circuit then controls the oscillator or means generating the high voltage applied to the CRT cathode. Such voltage divider must ordinarily be employed because of the wide disparity in voltage level usually present between the output and the regulation circuits. Unfortunately, it is difficult to obtain resistors for such a voltage divider which are reliable in the sense of being relatively non-subject to failure, and which at the same time are capable of providing an accurate control voltage which will not drift. Resistors which are relatively drift-free are relatively more prone to failure, and vice versa.

SUMMARY OF THE INVENTION

In accordance with an embodiment of the present invention, the control voltage for a regulated high voltage power supply, such as hereinbefore described, is acquired at a low voltage level via a low voltage winding means coupled to the power supply transformer. Therefore, no voltage divider need be employed between high and low voltage points. An a.c. voltage is induced in such low voltage winding means as a result of oscillation current in the transformer, and a peak value of such a.c. voltage is produced in a peak detector. The output of the peak detector is in turn applied to a control amplifier employed for varying the d.c. bias applied to the power supply oscillator. The amplitude of the oscillations produced is caused to increase as the power supply high voltage output decreases, and vice versa.

Since the aforementioned control voltage is not acquired at exactly the same point at which the high voltage output is secured, additional circuitry is included to compensate for the effects of voltage drop and the like, for example, due to transformer winding resistance, leakage inductance, power supply rectifier discharge between oscillation cycles, etc. Such additional circuitry includes means in series with the transformer high voltage output winding for supplying an additional control signal proportional to current drawn from the high voltage output winding. Such control signal is applied to the control amplifier in a manner such that the amplitude of oscillations increases as current drawn increases, and vice versa.

It is therefore an object of the present invention to provide an improved high voltage regulation circuit wherein the control input therefor is derived at a low voltage level.

It is another object of the present invention to provide an improved high voltage regulation circuit which does not employ a conventional d.c. voltage divider between a high voltage level in the circuit and a low voltage control level in the circuit.

It is another object of the present invention to provide an improved high voltage regulation circuit for a cathode-ray tube power supply employing an oscillation transformer, wherein the control voltage is derived from a low voltage winding on such transformer.

The subject matter which we regard as our invention is particularly pointed out and distinctly claimed in the concluding portion of this specification. The invention, however, both as to organization and method and operation, together with further advantages and objects thereof, may best be understood by reference to the following description taken in connection with the accompanying drawings wherein like reference characters refer to like elements.

DRAWINGS

FIG. 1 is a block diagram of a high voltage regulation circuit according to the present invention; and FIG. 2 is a schematic diagram of such a high regulation circuit.

DETAILED DESCRIPTION

Figure 1:
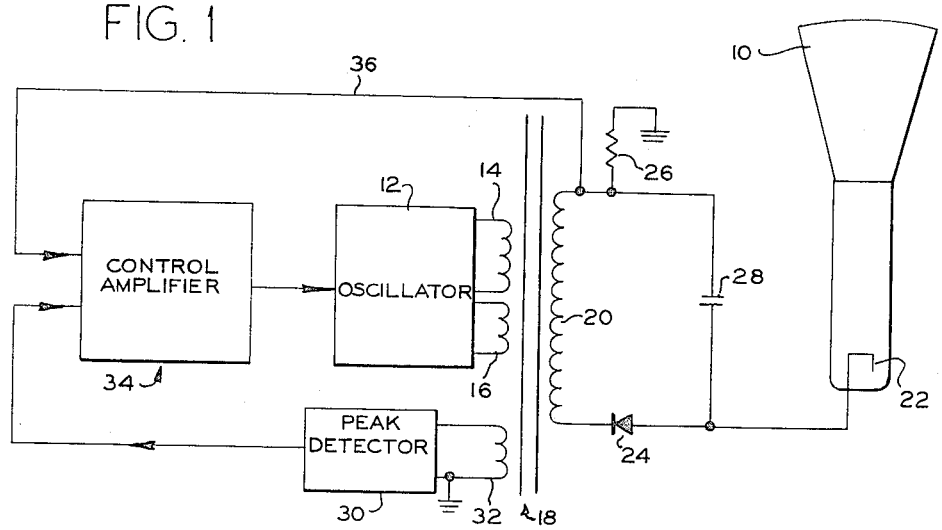

Referring to the drawings, and particularly to FIG. 1, a power supply for a cathode-ray tube 10 includes an oscillator 12 having an oscillator output winding 14 and a feedback winding 16 inter-coupled by means of high voltage transformer 18. High voltage transformer 18 also has wound thereupon a high voltage secondary winding 20, one terminal of which is coupled to cathode 22 of cathode-ray tube 10, through negatively poled diode 24. The opposite end of high voltage secondary 20 is connected to ground through an impedance taking the form of a resistor 26. A filter capacitor 28 is connected between such opposite end of the high voltage secondary and the anode of diode 24. The turns ratio of transformer 18 is such that during operation of oscillator 12 a high pulsating voltage tends to be induced in winding 20. Because of the rectifying action of diode 24, a high negative voltage appears at cathode 22 relative to ground.

According to the present invention, regulation circuitry which suitably includes a peak detector 30 receives an input from a control winding 32, the latter also being coupled to transformer 18, and the aforementioned peak detector is constructed to measure the peak value of the control voltage induced in winding 32. Winding 32 is a low voltage winding, and is suitably grounded at one end as indicated, but the voltage induced therein is approximately proportional to the output of the oscillator 12 and also approximately proportional to the high voltage induced in winding 20. Control amplifier 34, receiving the output of peak detector 30, operates to decrease the bias of oscillator 12, allowing the amplitude of the oscillations produced to increase, as the voltage at peak detector 30 decreases. Similarly, if the high voltage output tends to rise, the voltage at peak detector 30 causes control amplifier 34 to increase the bias of oscillator 12 in order to reduce the amplitude of the oscillations produced. Since the voltage provided at peak detector 30 is substantially proportional to the high voltage output of the supply, the operation of the circuit tends to compensate for such high voltage output changes as may tend to occur.

As indicated above, the control voltage is acquired at winding 32, which is at a low voltage level in the circuit, and therefore a voltage divider between high voltage cathode 22 and control amplifier 34 is not required. However, since winding 32 is not at exactly the same circuit location as cathode 22, additional means are employed to compensate for such intermediate voltage drops as may occur. Such circuit means comprises an impedance, here taking the form of resistor 26, in series with high voltage winding 20. A connection 36 couples the juncture between resistor 26 and winding 20 to control amplifier 34. As increased current is drawn by cathode 22 through winding 20 and resistor 26, a change in voltage will take place across resistor 26 and this change is coupled to the control amplifier for in turn causing the control amplifier to increase the amplitude of oscillations produced by oscillator 12. Similarly, if the current drawn decreases, the amplitude of oscillation is caused to decrease. This circuit therefore tends to compensate for differences in proportionality between the voltage across winding 32 and at cathode 22, for example due to transformer winding resistance, transformer leakage inductance, discharging of diode 24 and capacitor 28 between oscillation cycles, and intermediate resistance in the circuit.

Figure 2:
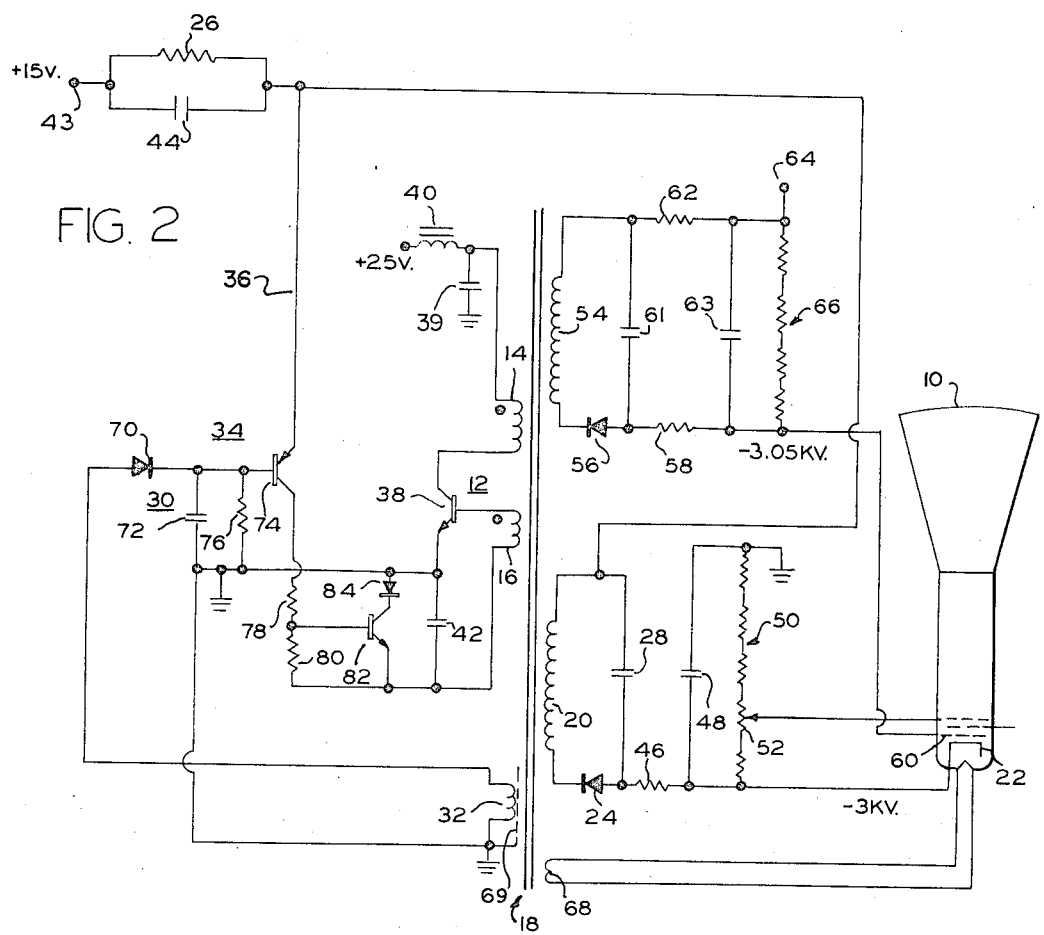

A more detailed circuit diagram of a high voltage regulation circuit in accordance with the present invention is illustrated in FIG. 2, wherein similar elements are referred to by like reference numerals. Here oscillator 12 comprises an NPN transistor 38 having its collector connected to a positive source through transformer oscillator output winding 14 in series with choke 40. The juncture between choke 40 and winding 14 is bypassed to ground employing capacitor 39. A first terminal of feedback winding 16, also wound on the same transformer, is connected to the base of transistor 38 while the remaining terminal of the winding is coupled to the transistor emitter through capacitor 42. The emitter of transistor 38 is suitably grounded.

High voltage winding 20 is connected at a first end thereof to a source of predetermined positive voltage at terminal 43 through an impedance comprising resistor 26 and capacitor 44 in parallel. The opposite end of winding 20 is coupled through negatively poled diode 24 and filter resistor 46 to cathode 22 of cathode-ray tube 10. A filter capacitor 28 is interposed between the anode of diode 24 and the juncture between resistor 26 and winding 20. A similar filter capacitor 48 is connected between cathode 22 and ground, and capacitor 48 is shunted by a voltage divider 50 including focus control 52 in series therewith.

A second high voltage winding 54 is also inductively related to transformer 18 and preferably has a similar number of turns, e.g. a slightly greater number than winding 20. Winding 54 is also preferably wound in a bifilar manner with winding 20. One end of winding 54 is connected through negatively poled diode 56 and resistor 58 in series to grid 60 of the cathode-ray tube. The remaining end of winding 54 is connected through resistor 62 to input terminal 64, and a voltage divider 66 is disposed between terminal 64 and grid 60. Filter capacitors 61 and 63 join similarly oriented ends of resistors 58 and 62. Both windings 20 and 54 are high voltage windings and have a relatively large number of turns as compared with the other windings described.

Winding 54, together with diode 56, capacitors 61 and 63, as well as resistances 58, 62, and 66 form a floating power supply between terminal 64 and grid 60. The purpose of this power supply is to elevate a Z-axis signal applied to terminal 64 to the voltage level desired for grid 60. This voltage level is desirably slightly negative with respect to cathode 22. An additional low voltage winding 68 is suitably provided on transformer 18 for supplying filament power to the cathode-ray tube.

In the circuit of FIG. 2, as thus far described, oscillator 12 produces oscillations in the form of a series of pulses or surges resulting from the feedback coupling provided by the transformer from oscillator output winding 14 to feedback winding 16. During operation of the oscillator, the juncture between capacitor 42 and winding 16 will attain a negative d.c. bias potential relative to the grounded emitter of transistor 38. This negative voltage is attributable to rectification at the base-emitter junction of transistor 38, and storage of such voltage upon capacitor 42. This negative d.c. bias potential determines the amplitude of oscillations produced by oscillator 12 since the bias is added to the feedback from winding 16, it being understood that transistor 38 is not allowed to go into collector saturation.

As a result of oscillator operation, a high voltage is induced in winding 20, and, of course, also in winding 54. Diode 24 is poled such that a negative high voltage, for example a negative 3 kilovolts, is applied to cathode 22, while a negative 3.05 kilovolt bias is similarly applied to grid 60 by virtue of rectification in diode 56. The end of winding 20 opposite diode 24 is connected through the parallel combination of resistor 26 and capacitor 44 to a predetermined small positive voltage applied at terminal 43, which voltage is relatively close to ground level. For example, this voltage is suitably maintained at a value equaling a positive 15 volts with respect to ground. The diode 24, together with capacitors 28 and 48 as well as resistor 46 and divider 50, produce a rectifying and filtering action for the voltage applied to cathode 22, such that this voltage is substantially d.c.

As hereinbefore described, during operation of high voltage cathode-ray tube power supply the voltage on the cathode is apt to vary, as, for example, when a variable amount of current is drawn from cathode 22. However, in a high quality oscilloscope it is desired that the cathode voltage be constant within 0.5 percent so that the instrument's calibration will be accurate. Therefore, regulation circuitry is also utilized herein, but this regulation circuitry does not employ a voltage divider between the high voltage and lower voltage level components. Rather, the control voltage is acquired at a low level, here at control winding 32. One end of this low voltage winding is grounded and a grounded electrostatic shield 69 is also suitably located between winding 32 and the transformer. The control voltage, acquired across winding 32, is applied to a peak detector 30 including a positively poled diode 70 connecting the ungrounded terminal on winding 32 to a storage capacitor 72, the opposite end of capacitor 72 being grounded. As the oscillator 12 produces oscillations, voltage is induced in winding 32 and diode 70 rectifies the resulting current so that the ungrounded end of capacitor 72 charges to a positive value. Very little current is drawn from this capacitor, and, hence, capacitor 72 charges to substantially the peak value of voltage induced in winding 32. The peak value of the voltage induced in winding 32 is substantially applied to the base of PNP transistor 74, the latter comprising the principal element of control amplifier 34. The voltage drops across diode 70 and the base-emitter junction of transistor 74 cancel, and also the effects of temperature changes upon these junctions tend to cancel.

Transistor 74 of control amplifier 34 has its emitter connected to the juncture between resistor 26 and high voltage winding 20, while the base of transistor 74 is returned to ground through resistor 76. The collector of transistor 74 is coupled to the junction of capacitor 42 and feedback winding 16 of the oscillator by means of resistors 78 and 80 disposed serially therebetween in that order. A shunting circuit is provided for capacitor 42 of oscillator 12 and comprises a control device in the form of an NPN transistor 82 having its emitter connected to the junction between capacitor 42 and winding 16, and having its base connected to the junction between resistors 78 and 80. The collector of transistor 82 is connected to the cathode of diode 84, the anode of which is connected to ground.

During operation of the regulation circuitry, the low level control voltage induced in winding 32 is applied to peak detector 30 which provides the input for control amplifier 34. Control amplifier 34, in turn, provides a control signal at the collector of transistor 74 for varying the current in resistors 78 and 80 in correspondence with the peak value of the control voltage so that the voltage at the base of transistor 82 is similarly varied. Transistor 82 shunts capacitor 42 to a greater or lesser degree as determined by its base voltage so as to proportionately determine the bias voltage for the oscillator 12 provided across capacitor 42.

Assume, for example, that the high voltage induced in winding 20 decreases. Therefore the lower voltage value across winding 32 will substantially proportionately decrease whereby a lower peak voltage is present across capacitor 72 and likewise upon the base electrode of transistor 74. Since the base of transistor 74 is negative-going relative to the transistor's positive emitter, a greater current will flow through the transistor and in resistors 78 and 80, raising the level of the base of transistor 82 with respect to its emitter. As a result, transistor 82 becomes more conductive, shunting capacitor 42 to a greater degree, and reducing the negative bias voltage thereacross. Therefore, the amplitude of oscillations delivered to oscillator output winding 14 will increase. Accordingly, the high voltage output will return toward its desired value. Of course, the reverse voltage changes take place should the high voltage output undesirably rise.

In this regulation circuit, amplifier 34 is provided with a comparison voltage through the parallel combination of resistor 26 and capacitor 44. Here, this comparison voltage is a positive 15 volts, but, of course, some other suitable value may be selected. The selected value should naturally be quite stable. The impedance of resistor 26 is quite small, so that substantially the same value applied at terminal 43 is also applied to the emitter of transistor 74. As a result of comparison between the voltage at terminal 43 and the peak voltage across capacitor 72 by transistor 74, a control signal is provided at the collector of transistor 74 for application to the oscillator circuit via transistor 82. The overall circuit will operate in the manner so as to maintain substantially the voltage value applied at terminal 43, e.g. 15 volts, as the voltage across winding 32, and this voltage determines, through the turns ratio of the transformer, the voltage appearing at the other windings.

Since the voltage across winding 32 is not precisely the output voltage applied to cathode 22 as multiplied by the turns ratio between winding 20 and winding 32, additional circuitry is utilized to compensate for this difference. The voltage at cathode 22 can have become reduced by the resistance of winding 20, leakage inductance of the transformer, voltage drop in diode 24 and resistor 26 as well as associated conductors, and also due to the discharge of the circuit comprising diode 24 and capacitor 28 between cycles. Accordingly, a current feedback circuit is provided which includes an impedance comprising the parallel combination of resistor 26 and capacitor 44 between the positive or upper end of winding 20 and terminal 43. As current drawn at cathode 22 of cathode-ray tube 10 increases, the voltage across resistor 26 changes by a proportional amount, thereby altering the comparison voltage applied at the emitter of transistor 74 of the control amplifier. The polarity of the connection is such that an increase in current to cathode 22 raises the voltage at the emitter of transistor 74, since the voltage drop across resistor 26 due to current in winding 20 is the reverse of the voltage drop due to current flowing toward the emitter of transistor 74 from terminal 43. As a result of this increase in voltage at the emitter of transistor 74, the current increases in the transistor's collector circuit, that is, the current increases through resistors 78 and 80. The voltage at the base of transistor 82 will rise, diminishing the negative oscillator bias developed across capacitor 42. Therefore, the oscillator feedback reaching the emitter of transistor 38 will increase and the amplitude of oscillations will increase. As a result the voltage provided at high voltage winding 20 will increase as the current drawn by cathode 22 increases, whereby to compensate for voltage drops, for example, between the transformer and the cathode 22. Resistor 26 in the current feedback circuit is paralleled by capacitor 44 to smooth out ripple otherwise likely to occur thereacross because of the oscillating nature of the voltage which is induced in high voltage winding 20.

As initially connected for operation, no a.c. voltage is developed across the windings of transformer 18, since no oscillation has been taking place in oscillator 12. Therefore, the ungrounded end of winding 32 is at ground potential, and the base of transistor 74 is similarly near ground. Resistor 76 provides sufficient base current for transistor 74 such that this transistor saturates. Also, the value of resistor 78 is chosen to provide sufficient current to start the oscillator. The junction between resistors 78 and 80 rises to a voltage which is the sum of the biased base-emitter drops of transistors 82 and 38. The emitter of transistor 82 will be slightly above ground or positive. Diode 84 is non-conducting at this time, permitting transistor 82 to be elevated above ground potential. The base of transistor 38 is also raised to a positive voltage, causing the initiation of oscillation. The route for the oscillator starting current through resistor 78 is then through the base-emitter junction of transistor 82, paralleled by resistor 80, and through feedback winding 16 to the base of transistor 38. After oscillations start, the hereinbefore described bias is developed across capacitor 42, and the emitter of transistor 82 drops below ground level. Therefore, diode 84 resumes its normally conductive state, and transistor 82 operates as a control device for shunting capacitor 42.

Various changes can be made in the circuit according to the present invention. For example, peak detector 30 could be replaced with a peak-to-peak-detector if so desired. Moreover, although winding 32 is shown as a separate and distinct low voltage winding on transformer 18, it is appreciated that this winding could form a low voltage portion of some other winding near ground level, with the circuit being altered accordingly.

While we have shown and described preferred embodiments of my invention, it will be apparent to those skilled in the art that many other changes and modifications may be made without departing from our invention in its broader aspects. We therefore intend the appended claims to cover all such changes and modifications as fall within the true spirit and scope of our invention.

We claim:

1. In a high voltage power supply including an oscillator circuit employing a step-up transformer with a high voltage winding from which a high voltage output is derived, the improvement comprising a regulation circuit for said power supply including:

first low voltage winding means on said transformer for deriving a first voltage from said transformer substantially proportional to said high voltage output, second control circuit means for comparing said first voltage with a predetermined voltage to obtain a control signal, third control circuit means for applying said control signal to said oscillator circuit for continuously controlling the amplitude of oscillations produced thereby in a sense for compensating for voltage changes in said high voltage output, and fourth means comprising an impedance connected in series with said high voltage winding which is responsive to current drawn from said high voltage winding for also varying the amplitude of said oscillations such that said amplitude increases as said current increases, and decreases as said current decreases.

2. The circuit according to claim 1 including a peak detector employing a rectifier for receiving the output of said low voltage winding and applying the same as an input to said second control circuit means.

3. The circuit according to claim 1 wherein said oscillator includes output and feedback windings on said transformer and wherein said oscillator receives a d.c. voltage bias in series with said feedback winding.

4. The circuit according to claim 1 wherein said low voltage winding means comprises a winding distinct from other windings on said transformer.

5. The circuit according to claim 2 wherein said oscillator includes a feedback winding and a coupling capacitor therefor, said circuit further including a control device shunting said coupling capacitor and receiving the output of said amplifier to vary the degree of shunting of said coupling capacitor under the control of said second control circuit means.

6. A high voltage power supply comprising:

a transformer having a high voltage output winding, an oscillator output winding, a feedback winding, and a control winding, oscillator means comprising an amplifying device having an output terminal coupled to said oscillator output winding and an input terminal coupled to said feedback winding, an amplifier having its input coupled to said control winding for receiving an input voltage therefrom and comparing the same with a comparison voltage to produce an output representative of the comparison, such output being coupled to control a bias voltage applied to the amplifying device of said oscillator means, and an impedance connected in series with said high voltage winding for providing thereacross at least a portion of the comparison voltage coupled to said amplifier.

7. The circuit according to claim 6 including a capacitor in series with said feedback winding for developing a bias voltage, and a shunting device coupled across said capacitor and controlled by the output of said amplifier to vary said bias voltage.

8. A high voltage power supply comprising:
a transformer having a high voltage output winding, an oscillator output winding, a feedback winding, and a control winding,
oscillator means comprising a transistor having its base coupled to said feedback winding and having its collector coupled to said oscillator output winding,
a capacitor disposed in series with said feedback winding and the emitter of said transistor, for developing a bias voltage,
an amplifier having an input coupled to said control winding for receiving an input voltage therefrom and comparing the same with a comparison voltage to produce an output representative of the comparison,
an impedance connected in series with said high voltage winding for providing thereacross at least a portion of the comparison voltage coupled to said amplifier,
and a shunting device coupled across said capacitor, said shunting device comprising a shunting transistor having its collector-emitter path and a diode in series therewith shunted across said capacitor, with said diode being located between said collector-emitter path and the emitter of the first mentioned transistor, said diode being poled normally to pass current to said shunting transistor, the base of said shunting transistor receiving the output of said amplifier for controlling the bias voltage of the first mentioned transistor.

9. A high voltage power supply comprising:
a transformer having a high voltage output winding, an oscillator output winding, a feedback winding, and a control winding,
oscillator means comprising an amplifying device having an output terminal coupled to said oscillator output winding and an input terminal coupled to said feedback winding,
an amplifier having its input coupled to said control winding for receiving an input voltage therefrom and comparing the same with a comparison voltage to produce an output representative of the comparison, such output being coupled to control a bias voltage applied to the amplifying device of said oscillator means,
a series diode interposed between said control winding and the input to said amplifier, and a capacitor coupled across the input of said amplifier, to develop at the input of said amplifier a peak value of voltage induced across said control winding,
and an impedance coupled in series with said high voltage winding for providing thereacross at least a portion of the comparison voltage coupled to said amplifier.

10. The circuit according to claim 9 wherein said amplifier comprises a transistor having its base connected to said diode, its collector coupled to control the bias voltage of said oscillator, and including a resistor and capacitor in parallel between the emitter of said transistor and a source of comparison voltage to form said impedance,
and including means coupling said high voltage winding to said emitter of said transistor.

11. A high voltage power supply for a cathode-ray tube comprising:
a transformer having a high voltage output winding, an oscillator output winding, a feedback winding, and a control winding,
a rectifying diode for coupling a first end of said high voltage winding to the cathode of said cathode-ray tube to provide a high d.c. voltage at said cathode,
oscillator means having an output terminal coupled to said oscillator output winding, and an input terminal coupled to said feedback winding,
an amplifier having its output coupled to control a bias voltage applied to said oscillator means, said amplifier acting to compare its input with a comparison voltage to produce an output representative of the comparison,
a second diode coupling said control winding to an input of said amplifier, and a capacitor coupled across the input of said amplifier, to develop, as the input of said amplifier, a peak value of voltage induced across said control winding,
and an impedance connected in series with the second end of said high voltage winding for providing thereacross at least a portion of a comparison voltage for said amplifier,
said amplifier comprising a transistor having its base connected to said second diode, its collector coupled to control the bias voltage of said oscillator, and its emitter coupled to the second end of said high voltage winding.

12. The circuit according to claim 11 including a second capacitor in series with said feedback winding for developing the bias voltage for said oscillator means, and a shunting device coupled across said second capacitor and controlled by the output of said amplifier to vary said bias voltage,
said oscillator means comprising a transistor having its base coupled to said feedback winding, its emitter coupled to said feedback winding through said second capacitor, and having its collector coupled to said oscillator output winding,
said shunting device comprising a shunting transistor having its collector-emitter path, and a third diode in series therewith, shunted across said second capacitor, with said third diode being located between said collector-emitter path and the emitter of the oscillator means transistor, wherein said third diode is poled normally to pass current to said shunting transistor, the base of said shunting transistor receiving the output of said amplifier.

13. A high voltage power supply for a cathode-ray tube comprising:
a transformer having a high voltage output winding, an oscillator output winding, a feedback winding, and a control winding,
a rectifying diode for coupling a first end of said high voltage winding to the cathode of said cathode-ray tube to provide a high d.c. voltage at said cathode,
oscillator means having an output terminal coupled to said oscillator output winding, and an input terminal coupled to said feedback winding,
an amplifier having its output coupled to control a bias voltage applied to said oscillator means, said amplifier acting to compare its input with a comparison voltage to produce an output representative of the comparison,
means coupling an integrated value of the voltage induced across said control winding as the input to said amplifier,
and an impedance connected in series with the second end of said high voltage winding for providing thereacross at least a portion of the comparison voltage for said amplifier, the remaining end of said impedance being connected to a reference potential.

14. A high voltage power supply for deriving a constant high d.c. voltage for a cathode-ray tube, said power supply including an oscillator, a step-up transformer having a low voltage primary winding and a high voltage secondary winding for stepping up the output of the oscillator, and means for rectifying and smoothing the output voltage at the secondary winding for application to said cathode-ray tube, the improvement comprising:
control means for controlling the output amplitude of said oscillator by controlling the bias circuit of the oscillator,
a low voltage winding coupled to the step-up transformer for driving said control means, said low voltage winding deriving thereacross a voltage substantially proportional to the high voltage output of the power supply,
a parallel combination of a resistor and capacitor connected in series with the high voltage secondary winding of the step-up transformer for detecting the quiescent load current, said control means also being driven by the voltage developed across said parallel combination.

* * * * *